(12) United States Patent
Hintzman et al.

(10) Patent No.: US 6,431,197 B2
(45) Date of Patent: Aug. 13, 2002

(54) REGULATOR VALVE FOR ESCAPE SLIDE

(75) Inventors: Roland D. Hintzman, Glendale; Christopher J. Bock; Richard B. Yori, III, both of Phoenix, all of AZ (US)

(73) Assignee: Goodrich Corp., Charlotte, NC (US)

( * ) Notice: Subject to any disclaimer, the term of this patent is extended or adjusted under 35 U.S.C. 154(b) by 0 days.

(21) Appl. No.: 09/970,426

(22) Filed: Oct. 2, 2001

Related U.S. Application Data

(62) Division of application No. 09/476,969, filed on Dec. 31, 1999, now Pat. No. 6,321,770.

(51) Int. Cl.[7] ............... F16K 17/40; B64D 25/14
(52) U.S. Cl. ............... 137/71; 137/494; 137/613; 222/3
(58) Field of Search ............... 137/68.11, 71, 137/494, 613; 193/25 B; 222/3; 251/315.01

(56) References Cited

U.S. PATENT DOCUMENTS

| | | | |
|---|---|---|---|
| 2,071,376 A | 2/1933 | Allen | |
| 3,702,623 A | 11/1972 | Chacko | |
| 3,840,057 A | 10/1974 | Lesh | |
| 3,930,517 A | 1/1976 | Gagala | ............ 137/71 |
| 4,513,881 A | 4/1985 | Heimovics, Jr. | |
| 4,520,838 A | 6/1985 | Fisher et al. | ............ 137/69 |
| 4,619,285 A | 10/1986 | Piet | ............ 222/3 |
| 4,683,910 A | 8/1987 | Benson et al. | ............ 127/519 |
| 4,907,617 A | 3/1990 | Whalen | ............ 137/71 |
| 5,009,249 A | 4/1991 | Fisher et al. | ............ 137/495 |
| 5,022,423 A | 6/1991 | Britt | ............ 222/3 |
| 5,103,853 A | 4/1992 | McGushion et al. | ............ 137/71 |
| 5,738,145 A * | 4/1998 | Daicho et al. | ............ 137/878 |
| 5,758,682 A | 6/1998 | Cain | ............ 137/71 |

* cited by examiner

*Primary Examiner*—Michael Powell Buiz
*Assistant Examiner*—Ramesh Krishnamurthy
(74) *Attorney, Agent, or Firm*—Jerry J. Holden; John D. Titus

(57) ABSTRACT

A system for controlling with safety the transfer or control of high pressure fluids from a container for use as to an inflatable escape slide. The pressurized container houses valve mechanisms such as a first and second valve mechanism, with the first valve mechanism controlling by actuation the on off flow of high pressure fluids to the second valve mechanism. The second valve mechanism controls the rate of flow by reducing the pressure for delivery to the inflatable escape slide. A safety valve operates in conjunction with the first valve mechanism and upon breaking of the valve mechanisms from the pressurized container to prevent the contents of the pressurized container from rapid escape or uncontrolled release.

18 Claims, 12 Drawing Sheets

REGULATOR VALVE FOR ESCAPE SLIDE

This application is a divisional of application number 09/476,969, filed on Dec. 31, 1999, now U.S. Pat. No. 6,321,770.

FIELD OF THE INVENTION

This invention relates to a system for controlling the flow of pressurized fluids and more particularly to valve devices or mechanisms for use with high pressure gas release vessels or containers on an aircraft emergency escape slide and off-shore emergency escape slides or as valve mechanisms on high pressure vessels to eliminate potential catastrophic problems of high pressure gas release.

BACKGROUND OF THE INVENTION

The inflatable escape slide and the pressure vessel along with its regulating valve system is stored adjacent to an egress door of an aircraft in a deflated condition. When necessary to evacuate the passengers and the crew members as quickly as possible, the deflated slide is deployed outwardly from the aircraft. As the slide is extended outwardly from the egress door, a lanyard is actuated to permit the escape slide to be pressurized from a pressurized pressure vessel or container and its regulatory valve.

The pressurized vessel or container and its valve system for safety reasons, must be constructed such that when inadvertently or by some accident such vessel is dropped, that the valves may sustain extensive damage without precipitating hazardous discharge of the stored gas. Under ordinary circumstance the rupture of the body of the regulating valves would cause an uncontrolled release of the pressurized gas or fluid and would cause the pressurized container to become self-propelled, thus putting any personnel or equipment close thereto in great danger. The escaping gases could propel the container or pressurized vessel at an alarming high velocity. One of the devices used to prevent these mishaps is a cage that encloses and protects the regulating valves. The cage prevents the separation of the valves from the pressurized container upon impact or inadvertent damage. The use of the cage adds extra weight to the escape slide system and since this is an aerospace application, the addition of weight is undesirable and should be avoided. In addition, the cage adds considerable volume to the system thus requiring the aircraft manufacturer to allot additional space on the aircraft for the auxiliary equipment. Further, the cage requires additional machining and welding which adds cost to the system.

The present invention eliminates the need for a cage and designs the valves with two portions: an upper portion that projects out of the container, a lower portion that is located within the body portion of the container that contains the high pressure fluid, and an integral safety valve that upon rupture of or any breaking of the upper portions of the valves will prevent the contents of the pressurized container from rapid escape or uncontrolled release. Such valves are lightweight in construction, compact, reliable and maintain a cost advantage over present structures.

SUMMARY OF THE INVENTION

A system for controlling with safety the transfer of pressurized fluids through valve mechanisms from a pressurized container at a lower controlled pressure to inflate an inflatable escape slide or otherwise provide a controlled measured flow. The container is mounted on the escape slide and has control and regulating valves, such as first and second valve mechanisms, secured thereto. The container has a necked portion to receive a nipple portion of the valve housing which contains the first and second valve mechanisms. The first valve mechanism is operative when actuated by suitable devices such as a lanyard to direct fluids at high pressures to the second valve mechanism whose function is to transfer the high pressure fluids at a lower controlled rate to the inflatable escape slide.

A safety valve is operated in conjunction with the valve mechanisms to insure the delivery of the high pressure fluids as required by the actuation. The safety valve is located in the nipple portion of the valve housing so that in the event the valve housing, which contains the first valve mechanism and the second valve mechanism, is broken off by accident as by dropping the container, the high pressure fluids are blocked from leaving the container. This action prevents the uncontrolled release of the pressurized gas or fluid which would cause the pressurized container to become self propelled at dangerously high velocities.

DETAILED DESCRIPTION

Figure 1:
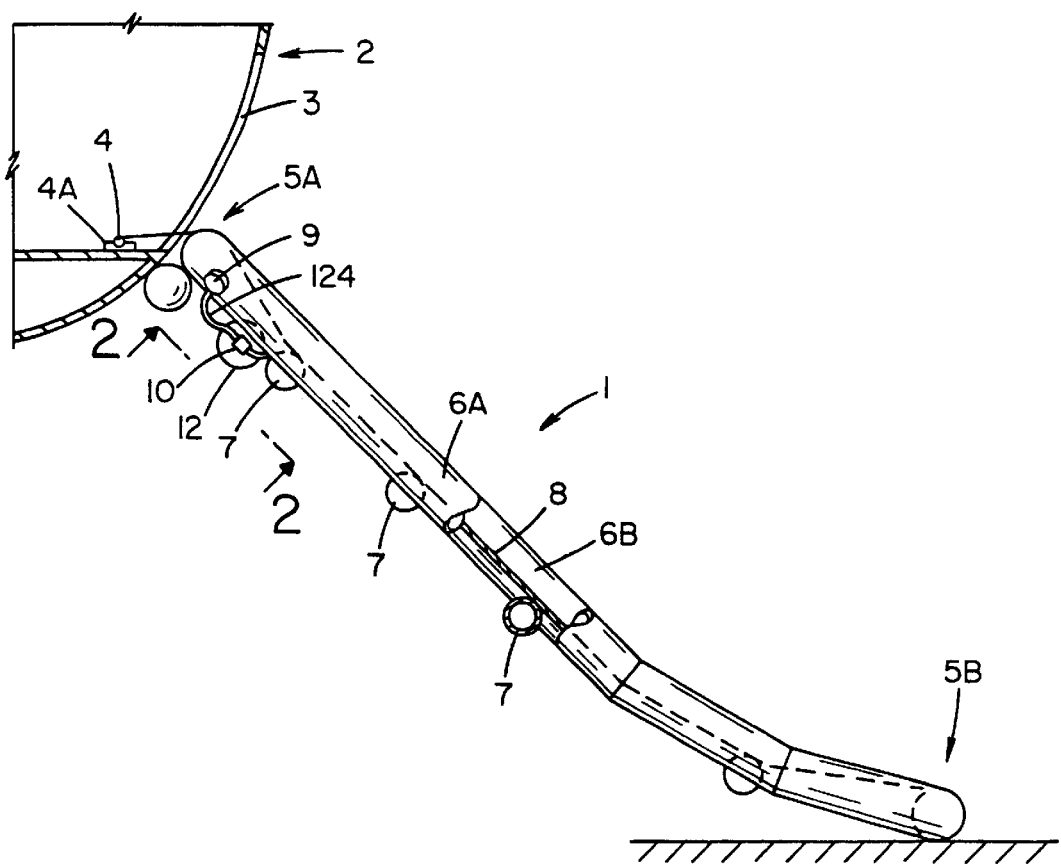
FIG. 1 is a side elevation view of an escape slide deployed from the fuselage of an aircraft, illustrating the slide fully deployed with a pressurized container mounted on the underside of the slide.
Figure 2:
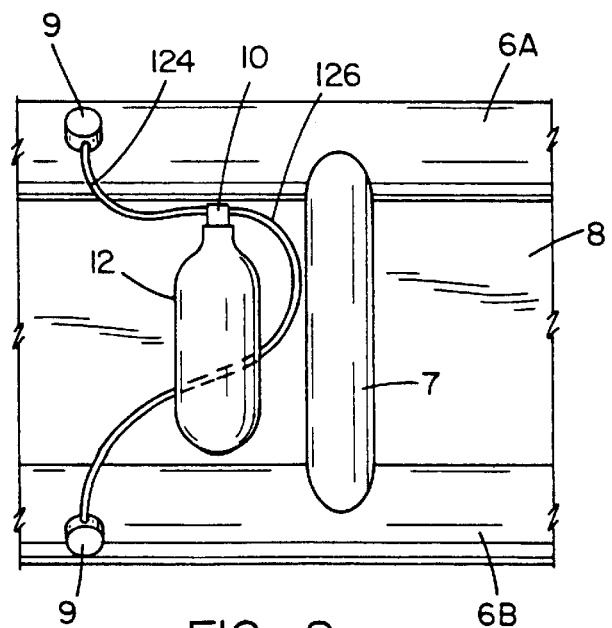
FIG. 2 is a fragmentary bottom view of that portion of the escape slide taken on line 2—2 of FIG. 1 showing a pressurized fluid container located on the escape slide.

Referring to the drawings wherein like reference numerals designate like or corresponding parts throughout the several views, there is shown in FIGS. 1 and 2 an inflatable evacuation escape slide 1 shown in the fully inflated condition extending from a supporting structure such as an aircraft's fuselage 2. The escape slide 1 is a conventional slide that is deployed through an egress door 3 during a period of on ground emergency to provide for the rapid evacuation of passengers and crew members.

The escape slide 1 is releasably fastened to the fuselage 2 at its upper end adjacent the doorway or egress door 3 by a rod or girt bar 4, which girt bar is mounted on the fuselage 2 in brackets 4A or by suitable means fastened to the fuselage 2. A positioning tube may be employed and located between the escape slide and the fuselage 2 to aid in the proper positioning of the slide 1 during deployment, but since it forms no part of the invention no further description nor depiction is necessary.

The inflatable escape slide 1 includes a head end 5A and a toe end 5B. The entire escape slide 1 is fabricated from a fabric or other suitable material coated with an elastomer. The various inflatable parts are joined together with a suitable adhesive whereby the composite structure will preclude air flow from the various chambers or tubes during operation in the inflated state. The escape slide 1 is of a multi-tubular construction having at least a pair of longitudinally extending tubes or tube members 6A and 6B on the respective sides and suitable inflatable cross tubes 7. A sheet 8 with a slide surface is suitably fastened to the respective side tubes and cross tubes in a manner old and well known in the art.

A suitable source of high pressurized gas or fluid such as a container or bottle 12 of compressed gas is suitably mounted on the underside of the escape slide 1, which bottle 12 is connected via a valve housing 10 and suitable conduits to aspirators 9 located on the side portion of tubes 6A and 6B. Additional containers of compressed gas, aspirators and hoses or conduits or any combination of them may be used.

Figure 8:
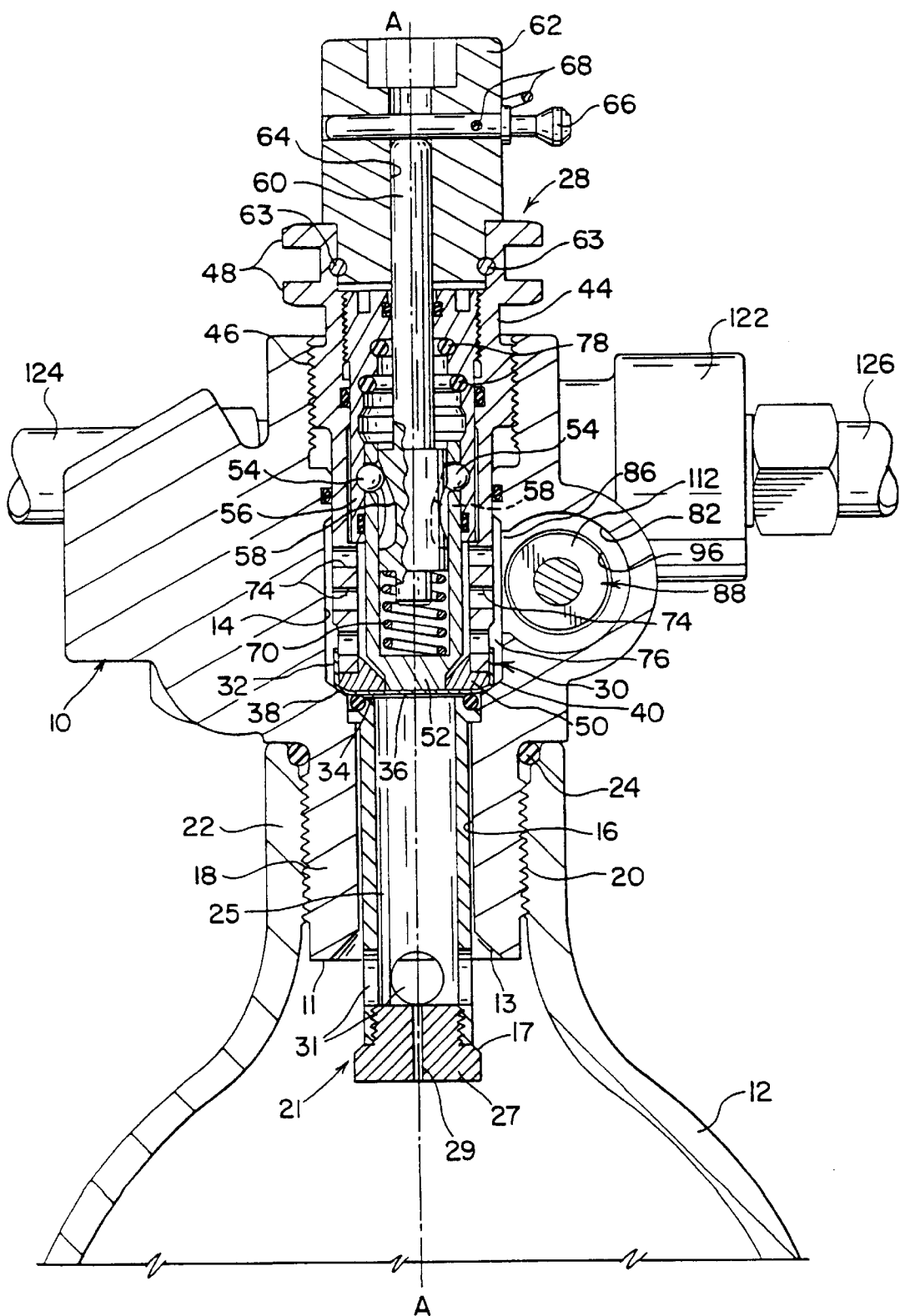
FIG. 8 is a sectional view taken along line 8—8 in FIG. 7 with parts being broken away.
Figure 9:
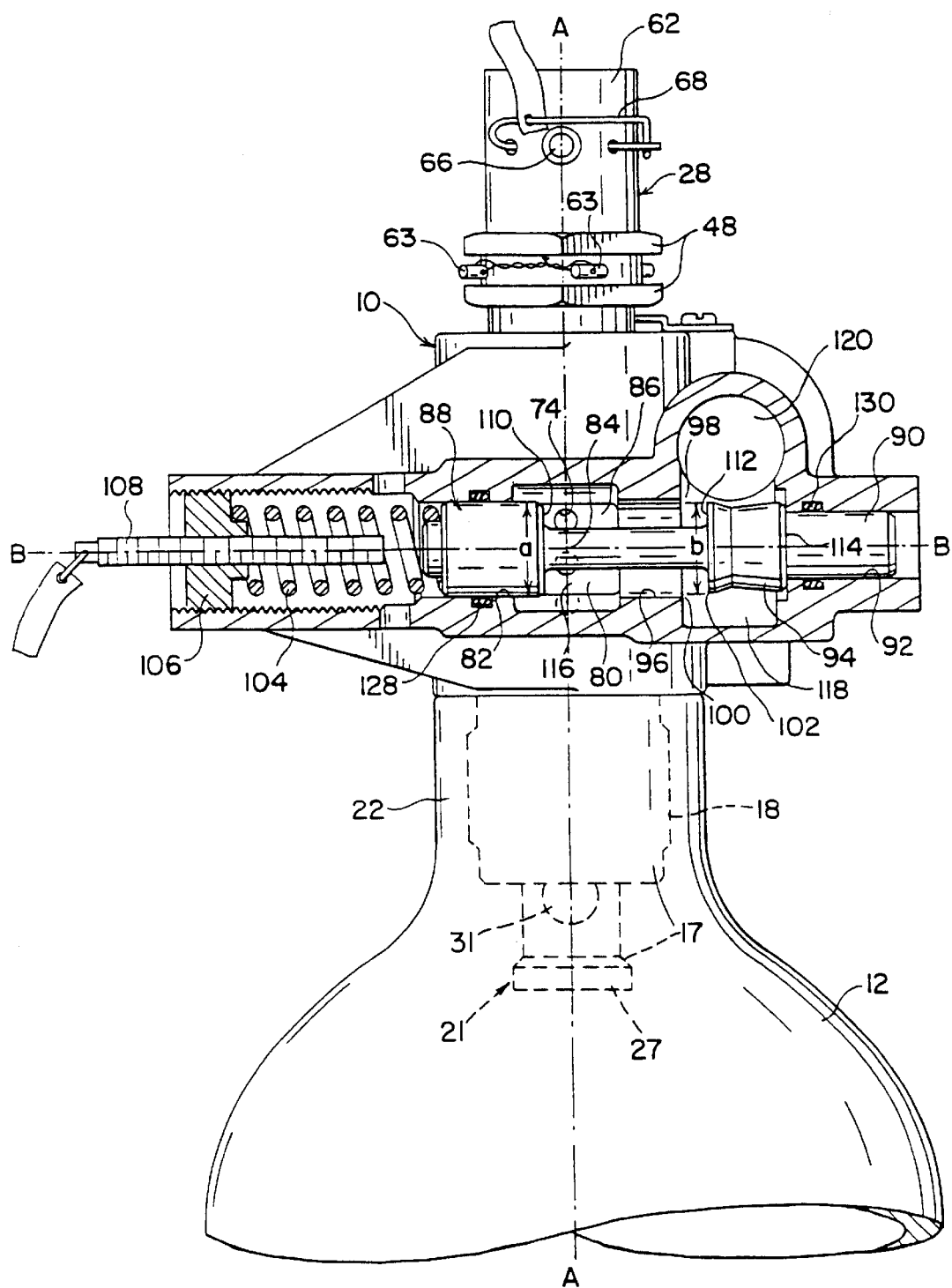
FIG. 9 is a sectional view taken along line 9—9 in FIG. 7 with parts being broken away.

Referring to FIGS. 8 and 9, the valve housing 10 which may be a machined casting is shown as mounted on the high pressure container or metal bottle 12 for containing gases at pressures up to approximately 5,000 pounds per square inch (351.5 kilograms per square centimeter). A generally cylindrical fluid passageway or conduit 14 having an axis A—A is located in the valve housing 10 in communication with an inlet passage, passageway or opening 16 which extends through a nipple 18 connected to the bottle or container 12 by a threaded connection 20 between the nipple 18 and a necked portion or neck 22 of the bottle or container 12. An O-ring 24 may be positioned between the nipple 18 and neck 22 to provide a fluid tight seal between the bottle 12 and the valve housing 10. The lower end portion of nipple 18 terminates into an annular surface 11 having an inner tapered or beveled sealing surface or seal 13.

Figure 10:
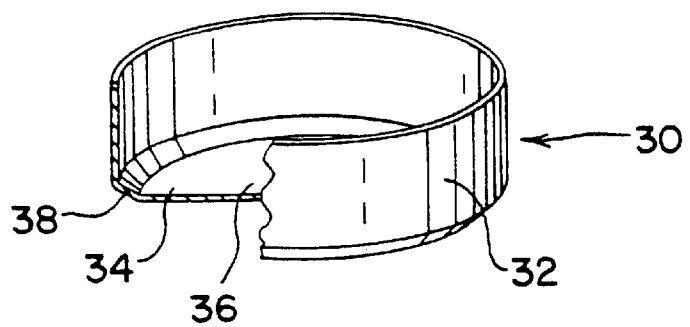
FIG. 10 is an enlarged view in perspective of a disc with a portion broken away.
Figure 11:
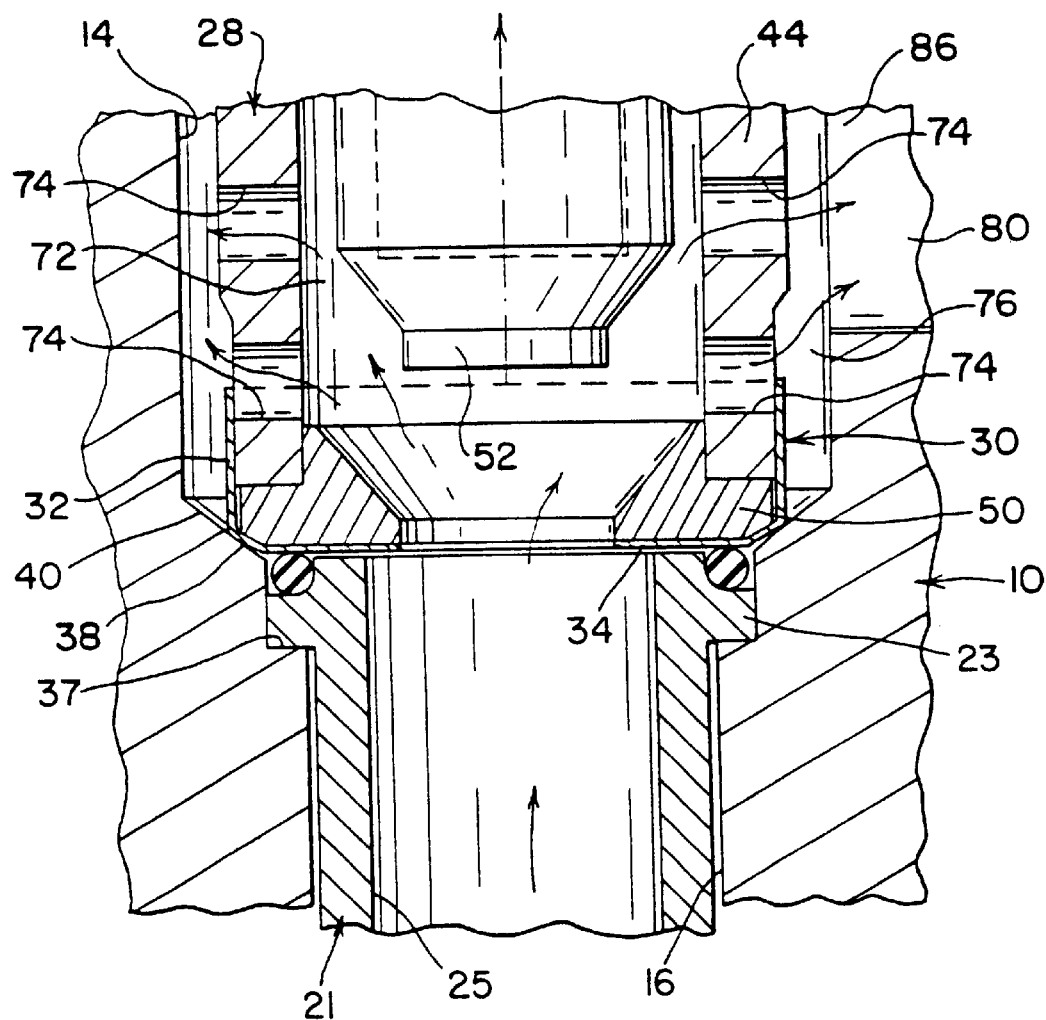
FIG. 11 is an enlarged fragmentary view of a portion of the first valve mechanism and safety valve showing the central support member retracted with the disc in the burst condition showing the top portion of the safety valve and illustrating the high pressure fluid flowing through opening in the disc towards the second valve mechanism where the fluid pressure is reduced for delivery to the escape slide.
Figure 12:
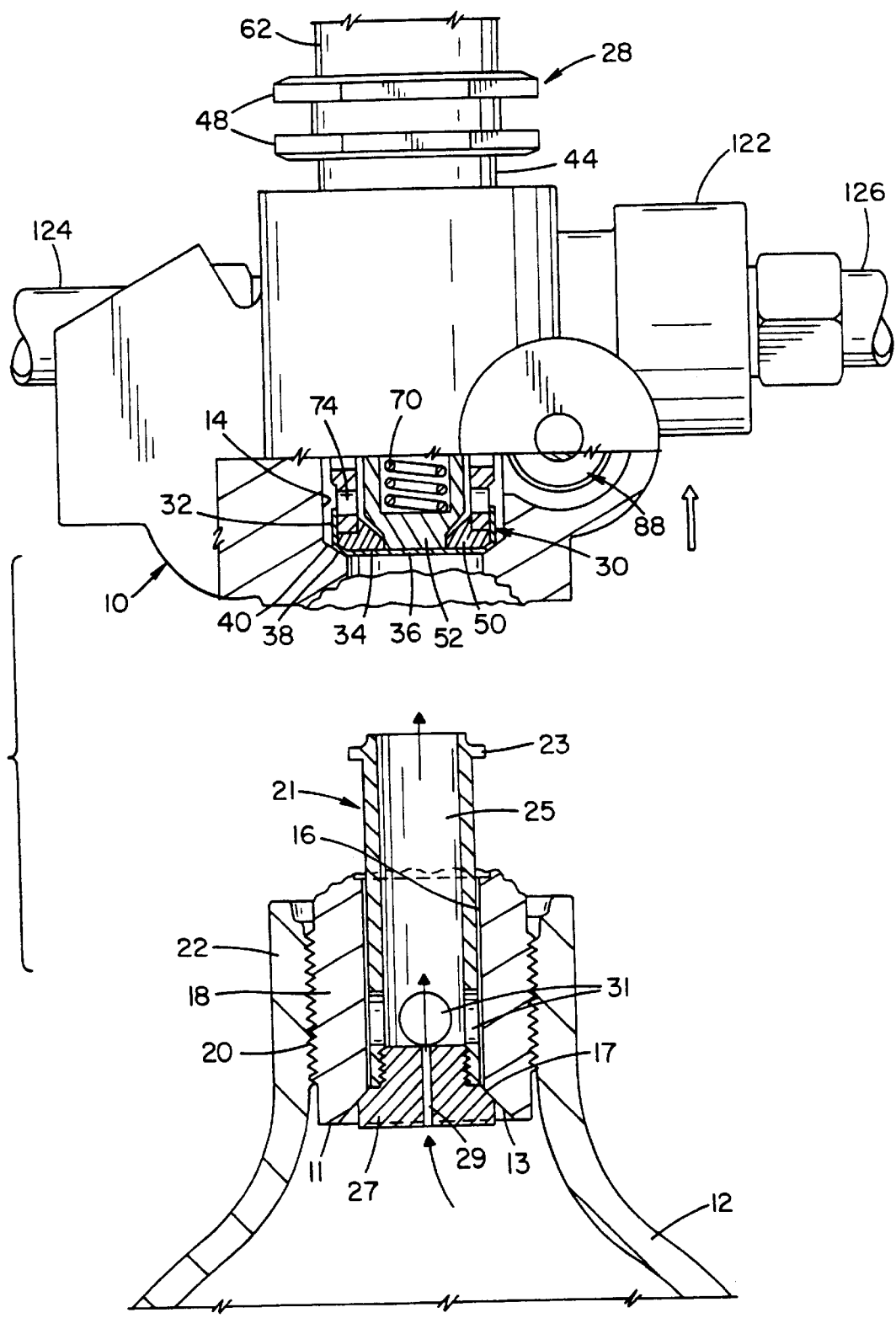
FIG. 12 is a side elevational view similar to that in FIG. 8 with portions of the valve mechanism broken away illustrating the breaking away of the valve housing from the fluid container and the safety valve blocking the flow of high pressure fluid.
Figure 13:
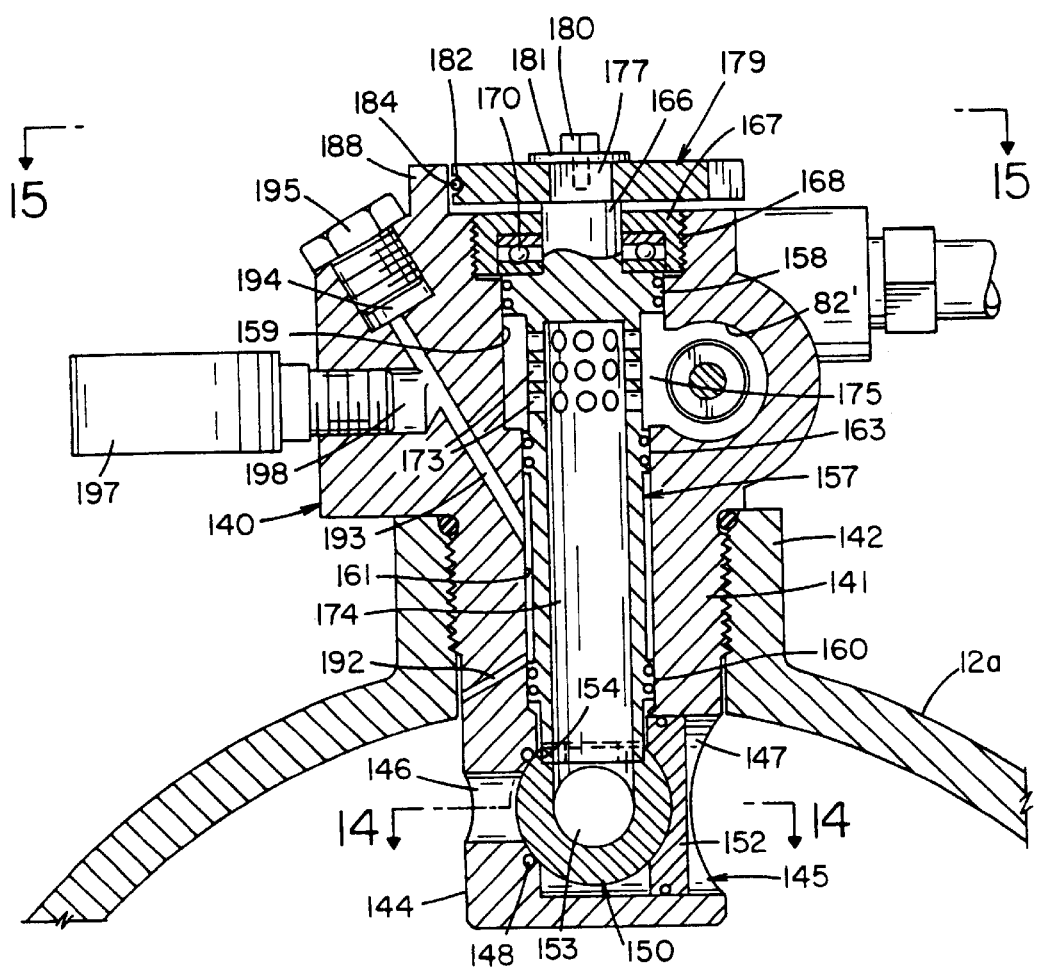
FIG. 13 is a sectional view of a second embodiment of a valve housing and valve mechanism with safety valve and first valve mechanism in the non-actuated condition.
Figure 14:
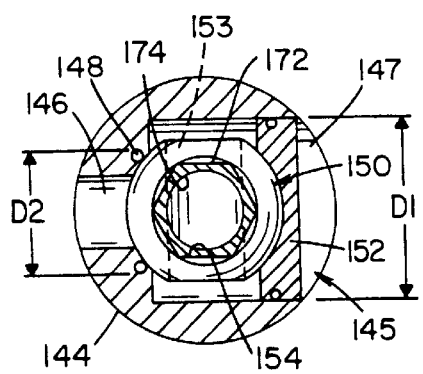
FIG. 14 is a cross sectional view of the safety valve and nipple portion of the valve housing taken on line 14—14 of FIG. 13.
Figure 15:
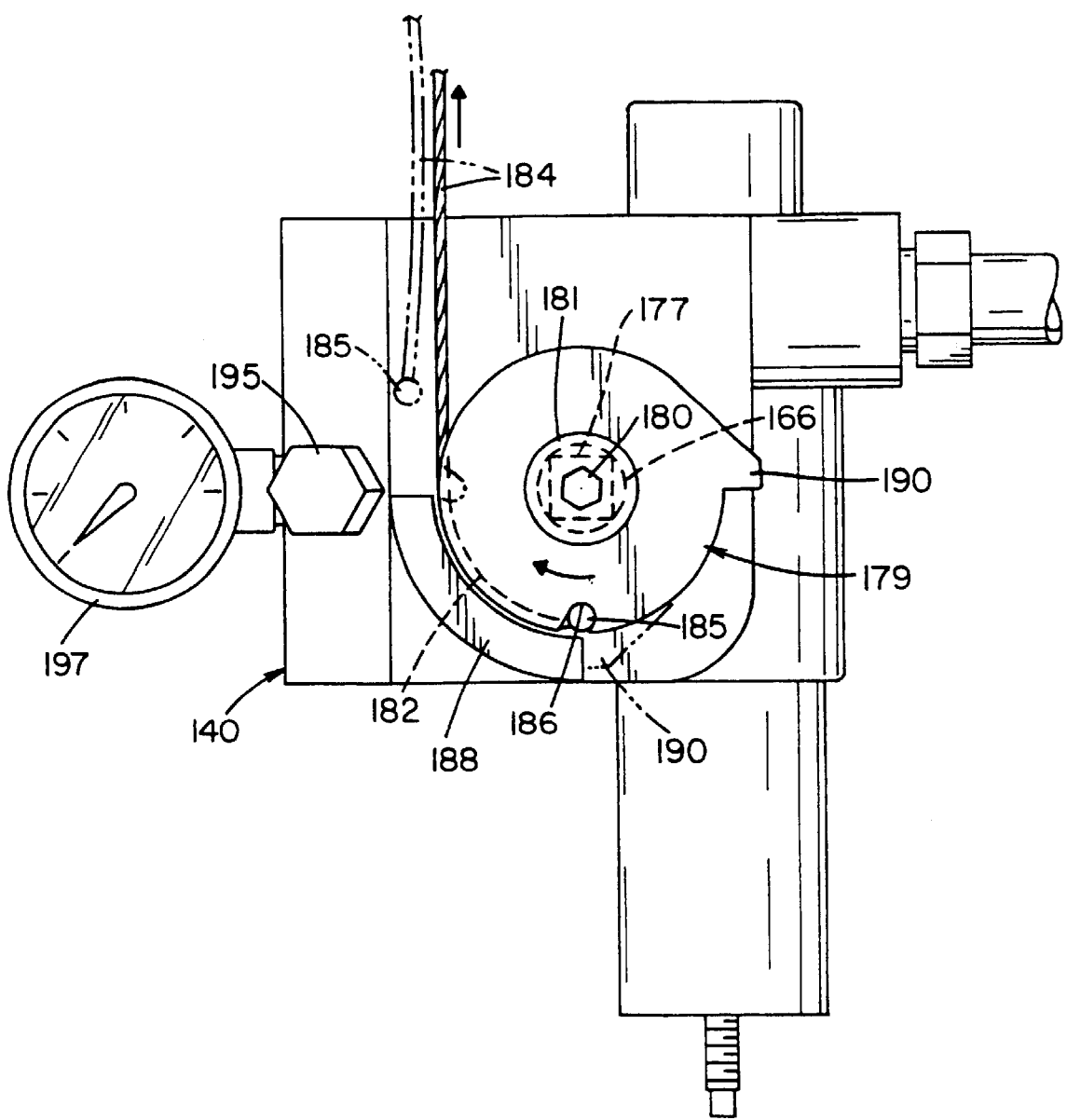
FIG. 15 is a plan view of the valve housing containing the valve mechanism taken on line 15—15 of FIG. 13.

To seal the bottle 12 against the flow of high pressure gas through the inlet opening 16 a cartridge member or release cartridge 28 is positioned and secured to valve housing 10 in the fluid passageway or conduit 14 in the closed condition of the cartridge 28 as shown in FIG. 8 and to be described. A metallic plate member such as disc member or disc 30 shown in greater detail in FIGS. 10 and 11 is mounted over the lower end of the cartridge 28. The disc 30 has a cylindrical wall 32 and a circular base 34 with a central portion 36 and a peripheral edge 38 with a beveled configuration to conform with a conical surface defining a valve seat surface 40 in the fluid passageway or fluid conduit 14 adjacent the inlet passage 16. Preferably the disc 30 is of a soft metal such as aluminum (1100-0 alloy) so that when the cartridge 28 is pressed downwardly towards the inlet passage 16 the metal of the disc 30 will be crushed against the valve seat surface 40 providing a fluid tight seal. A recessed shoulder 37 (FIG. 11) is provided between the inlet passageway 16 and the conical valve seat surface 40. A longitudinally extending cylindrical safety valve 21 is located within the inlet passageway 16 and has an enlarged circumferentially extending upper edge portion 23 that is seated on the recessed shoulder 37. Safety valve 21 has a central bore 25. The lower end portion of safety valve 21 has a circular plug 27 suitably connected thereto. Plug 27 has an annular portion that defines a beveled seating surface 17 which is adapted to frictional seat on the beveled seating surface 13 of nipple 18 for a purpose to be described. A narrow vent, aperture or bore 29 extends through the plug 25 to communicate the main high pressure reservoir of container 12 with the central bore 25. The lower end portion of cylindrical safety valve 21 has a plurality of apertures 31 to communicate the reservoir of container 12 with the central bore 25 to permit the high pressure fluid from container 12 to be maintained on the bottom surface of circular base 34. Referring to FIG. 8, the cartridge 28 has a generally cylindrical wall 44 with a threaded connection 46 with the valve housing 10. Hexagonal flanges 48 may be provided which are adaptable for gripping by a wrench to rotate the cartridge 28 to move it towards or away from the inlet passage 16. A disc support is provided which includes the thrust collar 50 mounted on the lower end of the wall 44 and a central support member such as engagement sleeve 52 (FIG. 8) which is positioned adjacent the thrust collar 50 and in supporting relationship with the central portion 36 of the disc 30.

As shown in FIG. 8 the engagement sleeve 52 is held in the cartridge 28 by a latch providing a mechanical advantage which includes latching balls 54 movable into holes in the engagement sleeve 52 and a groove in a ball retainer sleeve 56 mounted in the wall 44 of the cartridge. The latching balls 54 are moved into the holes in the engagement sleeve by ramps 58 in a trigger pin 60 movable axially of the fluid conduit 14. The trigger pin 60 is part of a release means including a swivel cap 62 mounted for rotation on the wall 44 and held in position by retainer wires 63. The swivel cap 62 has a bore 64 in which the trigger pin 60 is slidable and a release pin 66 movable through an intersecting bore into position to block the bore and hold the trigger pin 60 down in the cocked position as shown in FIG. 8. A safety pin 68 may be inserted through the swivel cap 62 and the release pin 66 to prevent the accidental operation of the apparatus. The safety pin 68 may be removed when the apparatus is ready for use.

An actuator spring 70 may be positioned within the engagement sleeve 52 and in engagement with the trigger pin 60 to urge the trigger pin upwardly (FIG. 8) into engagement with the release pin 66 for providing sufficient pressure against the release pin 66 to hold it in place while at the same time limiting the pressure so that an aircraft attendant can remove the release pin manually. Also when the release pin 66 is removed, the actuator spring 70 and the action of the latching balls 54 will raise the trigger pin 60 actuating the latch by allowing the latching balls 54 to move into the ramps 58 and out of the groove in the ball retainer sleeve 56 and the holes in the engagement sleeve 52.

The above described cooperative elements of the cartridge member 28 including the disc 30, thrust collar 50, engagement sleeve 52, latch balls 54, ramp 58, trigger pin 60, release pin 66, and swivel cap 62 define a first valve mechanism that operates as an on off valve that releases the reservoir of high pressure gas upon actuation. This first valve mechanism routes the high pressure gas to a second valve mechanism to be described which controls the output pressure of the device described. The first valve mechanism and the second valve mechanism is referred to as a valve means or the overall valve mechanism.

In the operation, when the engagement sleeve 52 is released in this manner described above, the high pressure of the fluid in the bottle 12 will rupture the unsupported control portion 36 of the disc 30 and force the engagement sleeve 52 upwardly to a position such as that shown in FIG. 11. The gases or fluids from the bottle 12 move in the direction shown by the arrows in FIG. 11 into a cartridge chamber 72 within the walls 44 and then through holes 74 in the wall 44 through an outlet passage 76. Impact dampers such as O-rings 78 of resilient material (Nitrile rubber) may be mounted in the ball retainer sleeve 56 of the cartridge 28 to cushion the impact of the trigger pin 60 and engagement sleeve 52 which are propelled upwardly by the high pressure gases into engagement with the cartridge upon rupture of the disc 30.

The outlet passage 76 is in communication with an inlet port 80 of a generally cylindrical pressure regulator chamber 82 in the valve housing 10 (FIG. 9). The pressure regulator chamber 82 has an axis B-B which is in cross configuration with the axis A-A of the fluid conduit 14 so that at a cross over point 84, the outlet passage 76 of the fluid conduit 14 and the inlet port 80 of the pressure regulator chamber 82 are combined in an intersecting passage 86.

Axially movable within the pressure regulator chamber 82 is a regulator member or piston 88 having a piston rod 90 slidably movable in a cylindrical opening 92 at the right end of the housing as shown in FIG. 9. A spool member 94 is mounted on the piston rod 90 and is movable to the left as shown in FIG. 9 into the cylindrical opening 96 providing a gas discharge orifice 98 between an edge 100 of the cylindrical opening 92 and an edge 102 of the spool member 94. The pressure regulator also includes a spring 104 and a spring adjuster 106 threaded in the pressure regulator chamber 82 for increasing or decreasing the compression of the spring acting on the piston 88. As shown in FIG. 9, a stop means such as spool stop screw 108 may be threaded in the spring adjuster 106 during charging of the bottle 12 with high pressure fluid to prevent over stroking the piston 88.

The piston 88 has an end area 110, the diameter of which is indicated by letter "a" in FIG. 9 which is greater than the end area 112 at the left side of the spool member 94, the diameter of which is indicated by letter "b" in FIG. 9. The spool also has a small end area 114 at the right side as shown in FIG. 9.

The second valve mechanism of the valve means referred to earlier includes the regulator member or piston 88 operative in chamber 82, rod 90, spool member 94, edge 102, and spring adjuster 106.

In operation the high pressure gas is communicated to a high pressure section 116 of the pressure regulator chamber 82 upon opening of the bottle 12 by rupturing the disc 30. This high pressure gas acts on the end area 110 of the piston 88 causing the piston and piston rod 90 to move to the left as shown in FIG. 9 to a position where the force of the spring 104 plus the force of the gas against the end area 112 of the spool member 94 is equal to the force from the gas pressure against the end area 110 of the piston and the pressure of the low pressure gas against the end area 114 of the spool. The gas discharge orifice 98 is then at a position to provide low pressure gas in a low pressure section 118 of the pressure regulator chamber 82 which is then communicated through outlet ports such as discharge ports 120 and 122 connected by hoses 124 and 126 to aspirators 9.

Seals such as O-rings 128 and 130 may be provided in the regulator chamber 82. In operation the high pressure gas from the intersecting passage 86 is at approximately 3,000 pounds per square inch (210.92 kilograms per square centimeter).

With this apparatus the bottle 12 may be charged with high pressure gas by closing one of the discharge ports 120 or 122 and connecting the other port to a source of high pressure gas.

Where there is an accidental dropping of the container or bottle 12 and the valve housing 10 is broken off at the neck 22 of the container 12, the safety valve 21 is moved upwardly by the pressure from the gas in the reservoir of the container 12 acting on the bottom surface of plug 27. The plug 27 of the safety valve 21 blocks the flow of pressurized fluid via apertures 31 since the plug 27 moves into engagement with the lower end portion of the inlet passageway 16. The beveled seating surface 17 of plug 27 comes into sealing engagement with the beveled seating surface 13 of nipple 18.

Such action blocks the flow path and reduces the discharge rate from the pressurized container 12 to prevent any propulsive reaction of the container. A small amount of leakage past the safety valve as via vent aperture 29 would allow the reservoir of container 12 to bleed down slowly without generating any propulsive forces. This installation of the safety valve 21 on the pressurized container 12 as described above allows the valve housing to sustain severe impact loads, without becoming self-propelled providing the container 12 is not itself significantly deformed A second embodiment of the invention is shown in FIGS. 13 through 17 where the container that houses the pressurized fluid is designated 12a and is identical to the container 12 of the first described embodiment.

A valve housing 140, which may be a machined casting, is shown as mounted on the high pressure container 12a. The valve housing 140 has a nipple portion 141 that threadedly engages the necked portion 142 of container 12a. The nipple portion 141 extends downward beyond the necked portion into the container 12a and is referred to as the lower end portion 144 of valve housing 140. Such lower end portion 144 has a stepped bore 145 extending crosswise through the valve housing 140. One side of such stepped bore 145 has a bore portion designated 146 and the other side of such stepped bore 145 has a bore portion 147 whose diameter is designated D1. The side wall of the stepped bore 145 at the juncture of bore portion 146 and bore portion 147 is circumferentially recessed to receive an annular seal 148 having an outside diameter D2 that is substantially smaller than diameter D1 for bore portion 147. The side wall of the stepped bore 145 that receives seal 148 may be arcuately recessed to receive one side of a ball valve 150. The diametrically opposite one side of such ball valve 150 abuttingly engages an annular thrust seal 152 that is arcuately contoured on its one side to frictionally engage such ball valve 150 and allows the rotation of a ball valve 150 while maintaining a pressure on ball valve 150. Annular thrust seal 152 has a diameter D1, identical to that of bore portion 147.

Ball valve 150 is journaled for rotation in the central portion of stepped bore 145. Ball valve 150 has a cylindrical bore 153 that extends therethrough for communicating with bore portion 146 when such ball valve 150 is rotated ninety (90) degrees from that position shown in FIG. 13 to that position shown in FIG. 16. The upper portion of ball valve 150 has a hexagonal shaped recess 154 that communicates with the cylindrically shaped bore in such valve 150 for a purpose to be described.

Valve housing 140 has a central stepped bore that extends from the uppermost end portion to the stepped bore 145 in the lower end portion 144. Mounted in such central stepped bore is a first valve mechanism or sleeve 157 with an upper solid cylindrical flange 158 that is frictionally received by bore or bore portion 159 of the central stepped bore and a lower annular flange 160 that is frictionally received by bore or bore portion 161 of the central stepped bore. In addition sleeve 157 has an annular flange 163 at its middle portion which is frictionally received by bore portion 161. The respective flanges 158,160 and 163 have annular seals to inhibit fluid leakage as is well known in the art. Immediately above the upper cylindrical flanges 158, the first valve mechanism or sleeve 157 has a cylindrically shaped shaft or rod 166 which receives an annular cap 167, which cap 167 is threadedly secured to the threaded upper end portion 168 of the central stepped bore. The lower portion of annular cap 167 has an annular recess to receive a thrust bearing 170. The annular cap 167 is suitably threaded onto the valve housing 140 to bear upon thrust bearing 170, which in turn frictionally bears onto upper flange 158 of sleeve 157 to permit selective rotation but maintains the vertical altitude and position (as viewed in FIG. 13). The lowermost end portion 172 of sleeve 157 is a hexagonal shape and is securely received by the hexagonally shaped recess 154 in top portion of ball valve 150. Rotation of sleeve 157 controls the ball valve 150 and controls the precise alignment of the cylindrical bore 153 in ball valve 150 with the bore or bore portion 146 and with the pressurized reservoir of the container 12*a*. Sleeve 157 is hollow from the upper cylindrical flange 158 to the hexagonal shaped end portion 172 (FIG. 14) that defines a central bore 174. A plurality of circumferentially and vertical spaced apertures 173 in the sleeve 157 adjacent to the upper cylindrical flange 158 communicate the central bore 174 with a pressure chamber 175, which in turn communicate with a bore or a pressure regulator chamber 82'. Such regulator chamber 82' is identical to the previously described regulator chamber 82 described in the first embodiment and receives the identical regulator member or second valve mechanism as described in the first embodiment and operates in the same manner.

The shaft 166 terminates in a reduced shaft or shaft portion 177 and journals for rotation therewith a circular flange member 179. The shaft portion 177 is centrally threaded to receive a bolt 180 which firmly secures the flange member 179 onto the shaft 177 with the aid of a washer 181. Circular flange member 179 has a circumferentially extending groove as at 182 along a portion of its periphery to receive and guide a lanyard 184 (FIG. 15) whose one end portion is secured to a pin 185 which in turn is frictionally held in a groove 186 (FIG. 15) on the flange 179. Such lanyard and pin 185 are subjected to being disengaged from the circular flange member 179 upon pulling on the lanyard as depicted by the dotted lines in FIG. 15.

The top portion of the valve housing 140 has an arcuate guide member 188 along a portion of the flange member 179 to insure the retention of the pin 185 and lanyard 184 within the groove 186 until the flange member was rotated ninety degrees which would rotate the sleeve or first valve mechanism 157 ninety degrees to align the cylindrical bore 153 in ball valve 150 with the high pressure fluids in container 12*a* via bore or bore portion 146. An abutment or stop member 190 on the flange member 179 is operative to engage the end of arcuate guide member 188 to limit the rotation of flange member 179 to ninety degrees.

Figure 16:
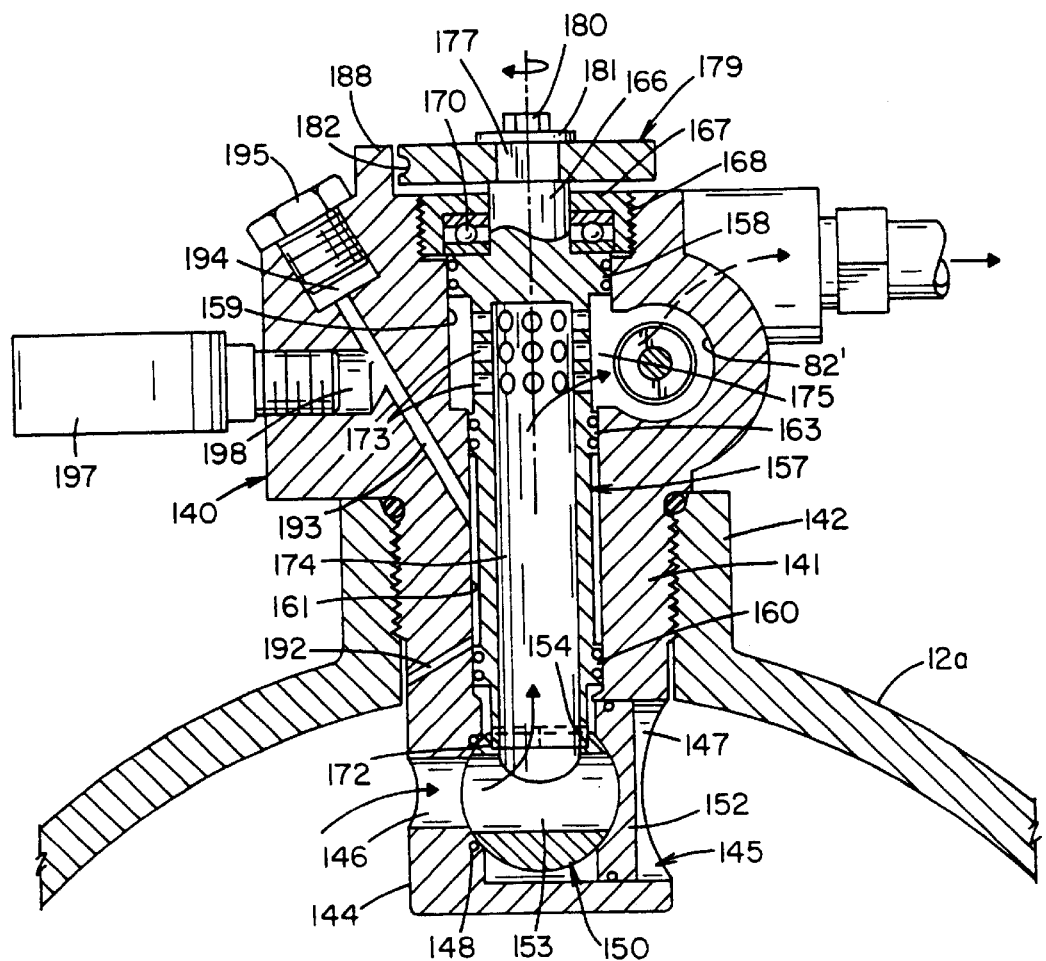
FIG. 16 is a sectional view of the valve housing and valve mechanism similar to that shown in FIG. 13 but with the first valve mechanism and safety valve in the actuated condition.

In the operation of the described embodiment, the lanyard 184 is rotated ninety degrees which rotates sleeve 157 and ball valve 150 to align cylindrical bore 153 with bore 146 as shown in FIG. 16 to conduct the high pressure fluids through the central bore 174, through the apertures 173 and into the pressure regulator chamber 82' for processing to a reduced controlled pressure by the regulator member or second valve mechanism as described in the first embodiment wherein the inflatable member as the escape slide is inflated by a controlled fluid pressure.

Figure 17:
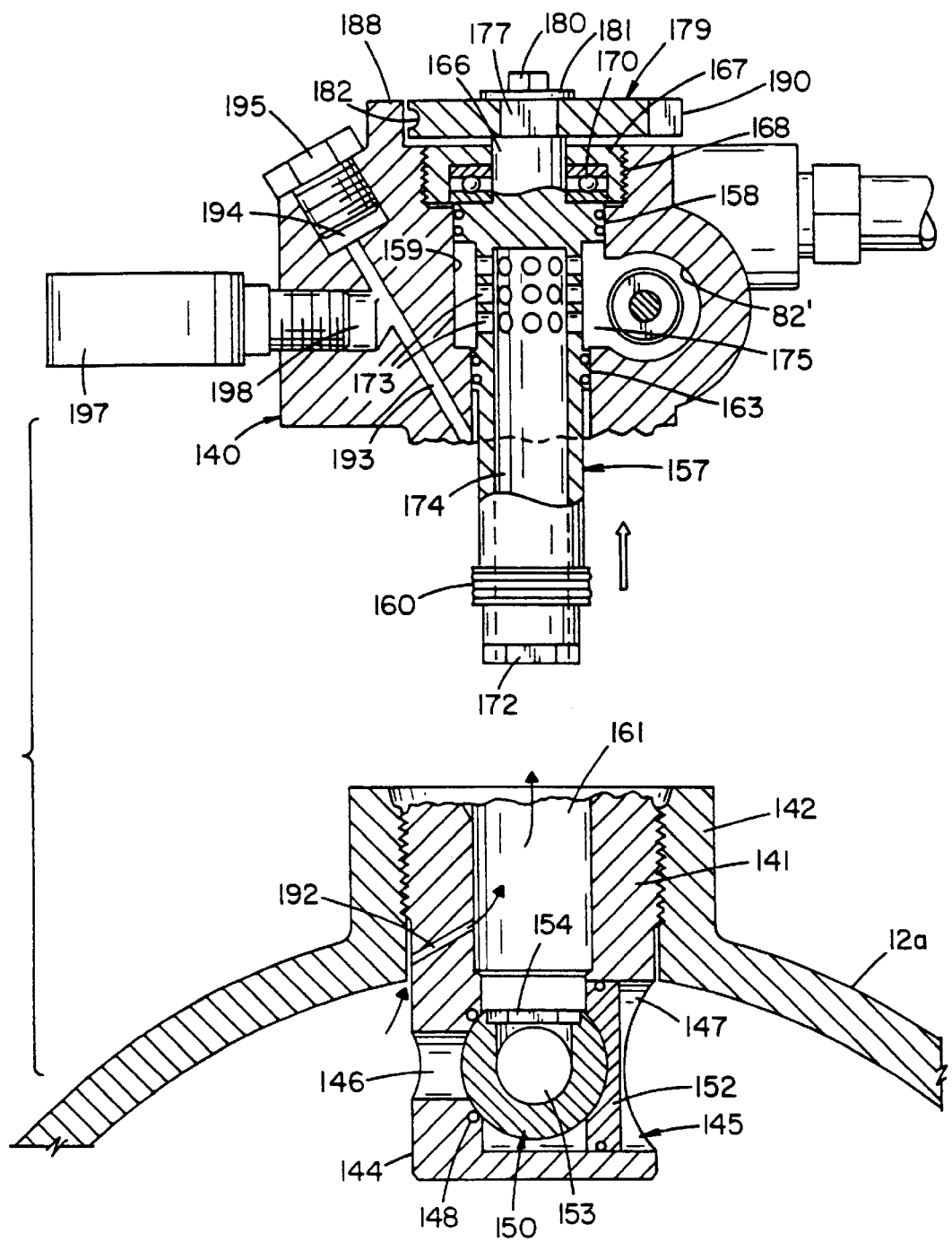
FIG. 17 is a side elevational view similar to that in FIG. 13 with portions of the valve housing and valve mechanisms broken away illustrating the breaking away of the valve housing from the fluid container with the safety valve blocking the flow of high pressure fluid.

In the accidental dropping of container 12*a*, breakage of the valve housing 140 would ordinarily result at the neck portion 142 as depicted by FIG. 17 wherein the first valve mechanism is in the non-actuated condition such that the cylindrical bore 153 in ball valve 150 is not aligned with bore 146 and thus block the flow of high pressure fluids out of bore 161. Such action prevents any propulsive reaction of the container 12*a*. To further insure the safe release of the high pressure fluid a vent bore 192 is located in the lower nipple portion 141 of valve housing 140 communicating with the bore 161. In the normal inoperative condition of the valves in the valve housing 140, an additional vent bore 193 is located in the upper portion of valve housing 140 communicating bore 161 with an outlet opening 194, suitably capped by a removable threaded bolt 195. A pressure gauge 197 may be suitably connected to a chamber 198 and vent bore 193.

Figure 3:
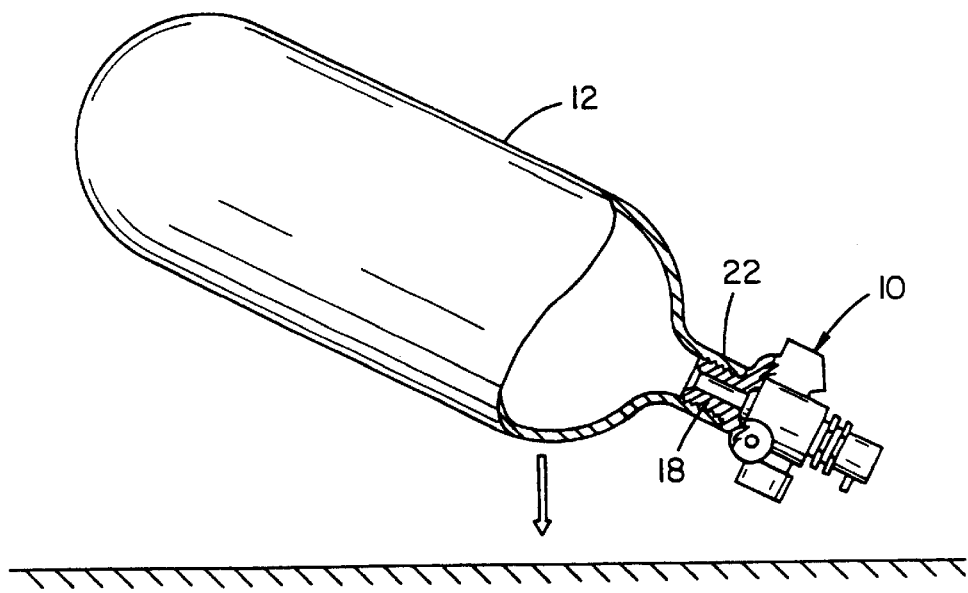
FIG. 3 is a side elevational view of a prior art container and valve mechanism with a portion broken away illustrating the container as falling and prior to impact with a hard surface.
Figure 4:
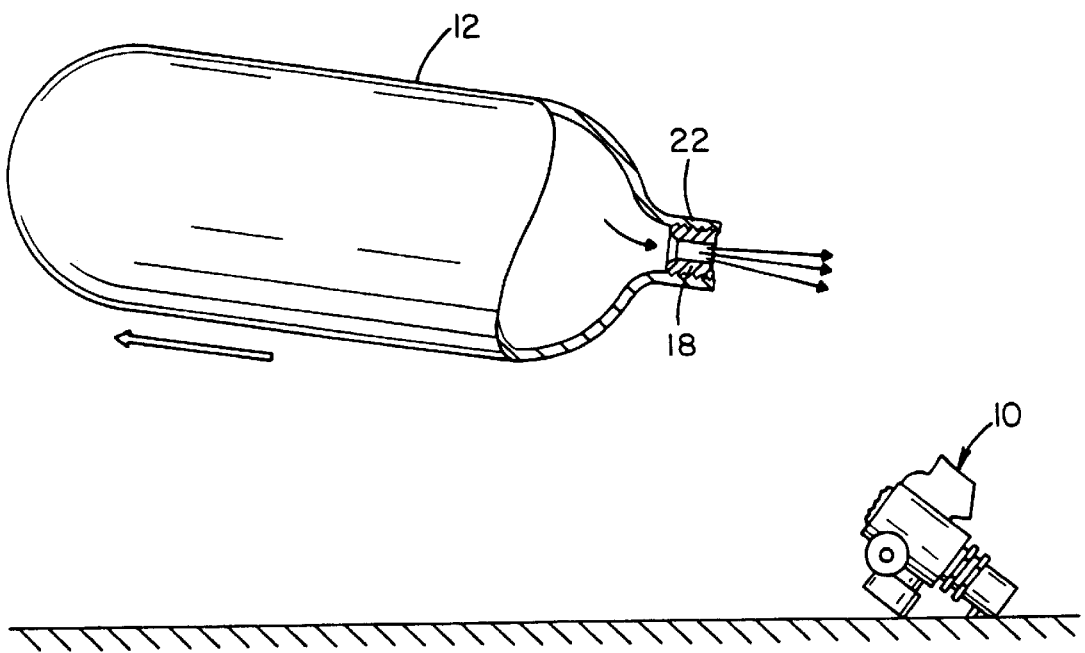
FIG. 4 is a side elevational view of the prior art container illustrated in FIG. 3 after impact, with the valve mechanism broken off and the container being propelled by the escaping high pressure fluid.
Figure 5:
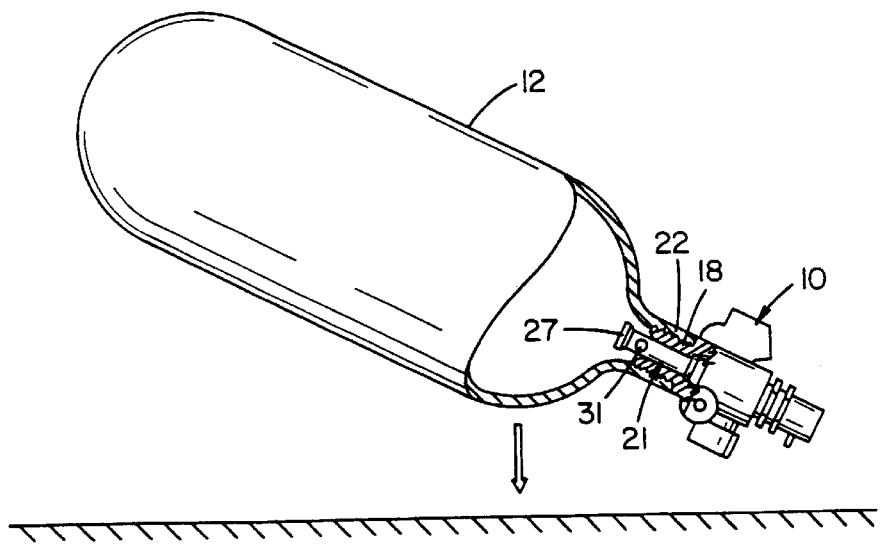
FIG. 5 is a side elevational view of the present container and valve mechanism with a portion broken away illustrating the container as falling and prior to impact with a hard surface.
Figure 6:
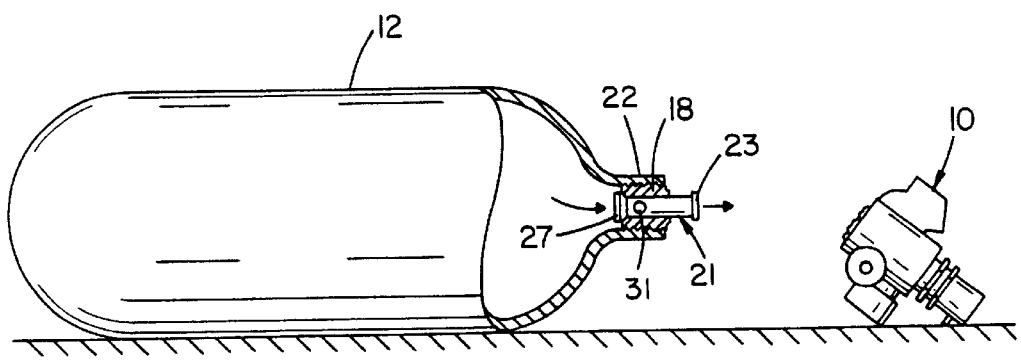
FIG. 6 is a side elevational view of the present invention illustrating the container and valve mechanism immediately after impact with a hard surface with the valve mechanism broken off.
Figure 7:
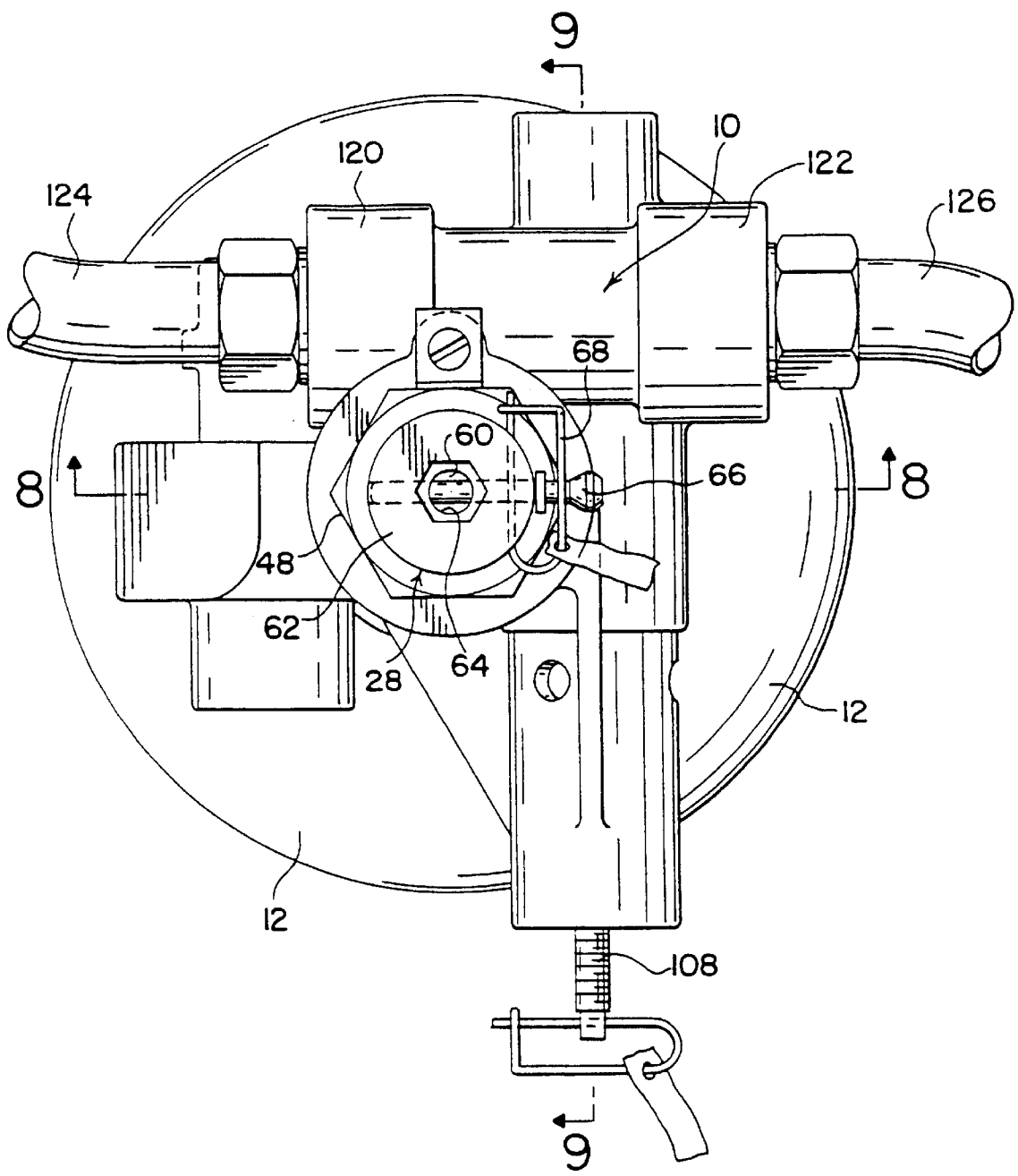
FIG. 7 is a plan view of the valve housing containing the valve mechanisms embodying the invention mounted on a fluid container or bottle.

FIGS. 3 and 4 illustrate the prior art problem of where the valves or valve mechanism which is mounted on the neck of a pressurized fluid container 12 when broken off, as by an accidental dropping of the container, would cause an uncontrolled release of the pressurized gas or fluid and would cause the pressurized container to become propelled at an alarming high velocity without specific direction. FIG. 5 and 6 illustrate the same condition of droppage with the valve mechanism broken off but because of the improved safety valve 21 as safety ball valve 150 would block the flow of high pressure fluid and permit the eventual venting of the high pressure fluids at a controlled safe rate and pressure.

The ball valve 150 in the second embodiment is held firmly and positively in its non-actuated position at all time by a pressurized force F (seat) exerted upon the ball valve 150 as represented by the following formula.

F (seat)=P (reservoir)−P (atmosphere) divided by the quantity (A1−A2).

Where F (seat) is the force exerted upon the ball valve 150 to force it into its seat.

P (reservoir) is the gage pressure of the fluid in the reservoir.

P (atmosphere) is the atmospheric pressure.

A1 is (diameter D1 divided by 2) quantity squared×Pi (where Pi is the ratio of the circumference of a circle to its diameter, approximated at times as 3.1416).

A2 is (diameter D2 divided by 2) quantity squared×Pi (where Pi is the ratio of the circumference of a circle to its diameter, approximated at times as 3.1416).

It is to be noted that without this force, F (seat), the seal would leak and be ineffective as a seal or safety valve, resulting in damages and injury caused by an uncontrolled release of the highly pressurized fluids from the container as discussed above.

While certain representative embodiments and details have been shown and described for the purpose of illustrating the invention, it will be apparent to those skilled in the art that various changes and modifications other than those referred to may be made therein without departing from the spirit or scope of the invention.

What is claimed is:

1. In a system for controlling the flow of pressurized fluids to an inflatable member, the system comprising an inflatable member, a storage container confining a pressurized fluid, said container having a necked portion at its uppermost end, a valve housing secured to said necked portion of said container, a valve means in said valve housing, said valve housing having a first valve mechanism and a second valve mechanism, said first mechanism moveable between an on and off position, said first valve mechanism operative in said on position for communicating high pressurized fluids to said second valve mechanism, said second valve mechanism being operative to control flow of pressurized fluids to said inflatable member at a predetermined pressure, a safety valve located in said necked portion in abutting: engagement with said first valve mechanism in said off position and cooperative herewith to block the flow of high pressure fluids from said container, and said safety valve operative to block the flow of high pressure fluids when said first and second valve mechanisms are broken off said necked portion of said container, wherein said first valve mechanism is moveable between an actuated condition and a non-actuated condition, and said safety valve is moveable with said first valve mechanism in said actuated condition to communicate said fluids from said container to said second valve mechanism for control thereby.

2. In a system for controlling the flow of pressurized fluids to an inflatable member as set forth in claim 1 wherein said first valve mechanism has a hollow sleeve whose one end portion extends downwardly below said necked portion into said storage container, said safety valve is secured to said one end portion for rotation thereby between a first position to deliver high pressure fluids to said hollow sleeve and a second position to block delivery of high pressure fluids, and said hollow sleeve having another end portion with apertures that communicate with said second valve mechanism for delivery of fluids thereto.

3. In a system for controlling the flow of pressurized fluids to an inflatable member as set forth in claim 2 wherein said safety valve is a rotatable ball valve with a bore that extends therethrough, and said bore of said ball valve communicates with said hollow sleeve at all times.

4. In a system for controlling the flow of pressurized fluids to an inflatable member, the system comprising: an inflatable member, a pressurized fluid container with a reservoir, said container having a necked portion at its upper end, a valve housing having a nipple portion extending into and secured to said necked portion, said valve housing having a central bore communicating with a stepped bore in a lower portion of said valve s housing that is below said necked portion, a valve means located within said valve housing, said valve means having a first valve mechanism and a second valve mechanism, said first valve mechanism moveable from a non-actuated condition to a actuated condition, actuator means operative to move said first valve mechanism to said actuated condition, a safety valve located in said nipple portion of said valve housing and is in cooperative engagement with said first valve mechanism, said first valve mechanism having holes for communicating with said second valve mechanism, said second valve mechanism having an outlet means for connection to said inflatable member, said second valve mechanism being operative to control is the output pressure to said outlet means, said safety valve being responsive to said first valve mechanism being moved from said non-actuated condition to said actuated condition to deliver pressurized fluids to said second valve mechanism through said first valve mechanism.

5. In a system in accordance with claim 4 wherein said first valve mechanism has a first portion extending outwardly of said necked portion of said container, and said first valve mechanism has a second portion located within said nipple portion of said container.

6. In a system in accordance with claim 5 wherein said safety valve is secured to said second portion of said first valve mechanism for movement therewith between said actuated condition and said non-actuated condition, and said safety valve operative in said non-actuated condition upon the breaking off of said first portion of said first valve mechanism from said container to block the flow of pressurized fluid from said container.

7. In a system in accordance with claim 6 wherein said other portion of said first valve mechanism has vent passageway means to slowly vent the flow of pressurized fluids from said container at a safe low rate when said valve means in broken at said necked portion.

8. In a system in accordance with claim 7 wherein said first valve mechanism has a hollow sleeve secured to said safety valve, said safety valve is controlled by said hollow sleeve between its actuated condition and its non-actuated condition, and said hollow sleeve communicates with said holes.

9. In a system in accordance with claim 8 wherein said safety valve is a rotatable ball valve with a bore that extends therethrough, and said bore of said ball valve communicates with said hollow sleeve at all times.

10. In a system in accordance with claim 9 wherein said bore of said ball valve blocks the flow of pressurized fluids to said hollow sleeve when said first valve mechanism is in said non-actuated condition.

11. In a system in accordance with claim 10 wherein said bore of said ball valve communicates only with said stepped bore in said actuated condition of said first valve mechanism.

12. In a system in accordance with claim 11 wherein said ball valve in said non-actuated condition of said first valve mechanism is journaled in said stepped bore with the axis of said bore of said ball valve being ninety degrees from the axis of said stepped bore, and a seal located in one end of said stepped bore subjects said seal to the pressurized fluid in said container to hold said ball valve stationary.

13. In a system in accordance with claim 12 wherein said ball valve has a polygonal recess that receives a polygonal portion of said hollow sleeve to provide an interconnection therebetween.

14. In a system in accordance with claim 4 wherein said first valve mechanism has a sleeve member jounaled for movement in said valve housing, said sleeve has a central bore that extends from the upper portion of said sleeve to the end portion thereof, said upper portion of said sleeve communicates via said holes to said second valve mechanism, said sleeve having a polygonal end portion, said valve housing having a stepped bore at its end portion located within said portion container, said safety valve. is a rotatable ball valve with a bore extending therethrough, said stepped bore having a first and second bore end portions communicating with said reservoir, said stepped bore having a central bore portion that receives a circular seal, said seal engages said ball valve, the upper portion of said ball valve having a polygonal recess that receives said polygonal end portion of said sleeve, said recess interconnects said bore of said ball valve with said holes in said sleeve, said first bore end portion and said central portion of said stepped bore being smaller in diameter than said second bore end portion, and a circular seal journaled in said second bore end portion and frictionally engaging said ball valve to hold said ball valve stationary.

15. In a system in accordance with claim 14 wherein the axis of said stepped bore intersects the axis of said bore of said ball valve and is located ninety degrees relative thereto when said first valve mechanism is in a non-actuated condition.

16. In a system for controlling the flow of pressurized fluids, the system comprising: a storage fluid container confining a high pressurized fluid, said container having a necked portion at its upper end, a valve housing having a nipple portion extending into said necked portion, said valve housing having a fluid conduit in communication with an inlet passage connected to said fluid container, said inlet passage extends through said nipple portion, a valve means secured to said valve housing, said valve means having a first valve mechanism and a second valve mechanism, said first valve mechanism moveable from a non-actuated condition to an actuated condition, actuator means operative to move said first valve mechanism to said actuated condition, a safety valve located in said nipple portion of said valve housing and is in cooperative engagement with said first valve mechanism, said first valve mechanism having holes for communicating with said second valve mechanism, said second valve mechanism having an outlet conduit, said second valve mechanism being operative to control the output pressure to said outlet conduit, said safety valve being responsive to said first valve mechanism being moved from said non-actuated condition to said actuated condition to deliver pressurized fluid to said second valve mechanism through said first valve mechanism.

17. In a system for controlling the flow of pressurized fluids, the system consisting of a pressurized storage container for the storage of high pressure fluids, a valve housing secured to said container, a moveable valve member mounted in said housing and operative between an actuated condition and a non-actuated condition, said moveable valve member operative in said non-actuated condition to block the flow of high pressure fluids from said container, said valve housing having an opening, said moveable member operative in said actuated condition to communicate said high pressure fluids from said container to said opening, actuator means operative upon actuation to effect movement of said moveable member from said non-actuated condition to said actuated condition, a safety valve mounted in said housing, said safety valve moveable between an actuated condition and a non-actuated condition, said safety valve operative in said non-actuated condition of said moveable valve member upon the breaking off of said valve housing to block the flow of high pressure fluids from said storage container, wherein said safety valve is actuated simultaneously with the movement of said moveable valve member from said non-actuated condition to said actuated condition.

18. In a system for controlling the flow of pressurized fluids as set forth in claim 17 wherein said safety valve is a rotatable ball valve secured to said moveable valve member.

* * * * *